US012420554B2

United States Patent
(12) United States Patent
Shimada et al.

(10) Patent No.: US 12,420,554 B2
(45) Date of Patent: Sep. 23, 2025

(54) PRINTING APPARATUS AND LIQUID CONTAINER

(71) Applicant: CANON KABUSHIKI KAISHA, Tokyo (JP)

(72) Inventors: Koki Shimada, Kanagawa (JP); Hideaki Matsumura, Tokyo (JP); Yuri Mori, Tokyo (JP); Tsuyoshi Saeki, Kanagawa (JP); Ken Takenaga, Kanagawa (JP); Daiju Takeda, Kanagawa (JP); Shota Asada, Tokyo (JP); Hiromasa Tsutsumi, Kanagawa (JP); Mineyoshi Tomie, Saitama (JP); Takao Kawai, Tokyo (JP); Megumi Ueta, Kanagawa (JP); Erika Iyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 18/327,858

(22) Filed: Jun. 1, 2023

(65) Prior Publication Data

US 2023/0405995 A1 Dec. 21, 2023

(30) Foreign Application Priority Data

Jun. 8, 2022 (JP) ................................ 2022-093094
Oct. 21, 2022 (JP) ................................ 2022-169397

(51) Int. Cl.
*B41J 2/175* (2006.01)

(52) U.S. Cl.
CPC ....... *B41J 2/17513* (2013.01); *B41J 2/17509* (2013.01); *B41J 2/17523* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17553
See application file for complete search history.

(56) References Cited

U.S. PATENT DOCUMENTS

| | | | | |
|---|---|---|---|---|
| 6,969,161 | B2 * | 11/2005 | Kuwabara ............ | B41J 2/17509 347/85 |
| 9,682,564 | B2 | 6/2017 | Saeki et al. .............. | B41J 2/175 |
| 9,738,081 | B2 | 8/2017 | Kimura et al. .......... | B41J 2/175 |
| 10,118,396 | B2 | 11/2018 | Kimura et al. .......... | B41J 2/175 |

(Continued)

FOREIGN PATENT DOCUMENTS

JP 2018-069717 5/2018

OTHER PUBLICATIONS

Extended European Search Report dated Oct. 19, 2023 in counterpart EP Application No. 23176923.3.

*Primary Examiner* — Anh T Vo
(74) *Attorney, Agent, or Firm* — Venable LLP

(57) ABSTRACT

A printing apparatus includes a liquid container. The liquid container includes a storage portion configured to store a liquid to be supplied to a discharge head that discharges the liquid, a first channel configured to be inserted into a replenishing bottle, which is configured to replenish the liquid to the storage portion, and to communicate with the replenishing bottle, and a second channel between the first channel and the storage portion, the second channel including, at an end portion on a side of the first channel, a first shape portion having a sectional shape common to a part of a sectional shape of the first channel.

30 Claims, 13 Drawing Sheets

(56) References Cited

U.S. PATENT DOCUMENTS

| | | | | |
|---|---|---|---|---|
| 10,357,977 | B2 | 7/2019 | Mukoyama et al. | B41J 2/175 |
| 10,427,412 | B2 | 10/2019 | Okude et al. | B41J 2/175 |
| 10,538,096 | B2 | 1/2020 | Abe et al. | B41J 2/165 |
| 10,654,283 | B2 | 5/2020 | Saeki et al. | B41J 2/175 |
| 10,766,271 | B2 | 9/2020 | Mukoyama et al. | B41J 2/175 |
| 10,836,180 | B2 | 11/2020 | Takahashi et al. | B41J 2/175 |
| 10,843,481 | B2 | 11/2020 | Shimoyama et al. | B41J 2/175 |
| 11,072,195 | B2 | 7/2021 | Kida et al. | B41J 29/377 |
| 11,135,852 | B2 | 10/2021 | Toki et al. | B41J 2/175 |
| RE49,336 | E | 12/2022 | Kimura et al. | B41J 2/175 |
| 11,584,132 | B2 | 2/2023 | Nagai et al. | B41J 2/175 |
| 11,613,138 | B2 | 3/2023 | Kida et al. | B41J 29/377 |
| 2010/0201761 | A1* | 8/2010 | Lu | B41J 2/17509 347/86 |
| 2016/0263900 | A1* | 9/2016 | Kimura | B41J 2/17566 |
| 2018/0111380 | A1 | 4/2018 | Kimura et al. | B41J 2/17523 |
| 2018/0272723 | A1* | 9/2018 | Shinada | B41J 2/17509 |
| 2020/0269589 | A1 | 8/2020 | Miyazawa et al. | B41J 2/175 |
| 2020/0316949 | A1 | 10/2020 | Shimada | B41J 2/175 |
| 2022/0009244 | A1 | 1/2022 | Matsumura et al. | B41J 2/175 |
| 2022/0016894 | A1 | 1/2022 | Nagaoka et al. | B41J 2/175 |
| 2022/0032633 | A1 | 2/2022 | Shimada et al. | B41J 2/175 |
| 2022/0258484 | A1 | 8/2022 | Ito et al. | B41J 2/175 |

* cited by examiner

PRINTING APPARATUS AND LIQUID CONTAINER

BACKGROUND OF THE INVENTION

Field of the Invention

The present invention relates to a printing apparatus and a liquid container.

Description of the Related Art

There is known a printing apparatus that discharges ink stored in an ink tank from a printhead to a print medium, thereby printing an image. If the remaining ink amount in the ink tank decreases, the user replenishes ink to the ink tank. If the replenishing work is quickly performed, convenience of the user improves. Japanese Patent Laid-Open No. 2018-69717 discloses an ink tank including a channel in which ink flows, and a channel used to remove air. Gas-liquid exchange is performed between an ink tank and a replenishing bottle by the two channels.

However, the structure disclosed in Japanese Patent Laid-Open No. 2018-69717 has room for improvement in terms of the flow-in speed of ink from the replenishing bottle to the ink tank.

SUMMARY OF THE INVENTION

The present invention provides a technique for improving the flow-in speed of a liquid from a replenishing bottle to a liquid container.

According to an aspect of the present invention, there is provided a printing apparatus comprising a liquid container, wherein the liquid container comprises: a storage portion configured to store a liquid to be supplied to a discharge head that discharges the liquid; a first channel configured to be inserted into a replenishing bottle, which is configured to replenish the liquid to the storage portion, and to communicate with the replenishing bottle; and a second channel between the first channel and the storage portion, the second channel including, at an end portion on a side of the first channel, a first shape portion having a sectional shape common to a part of a sectional shape of the first channel.

Further features of the present invention will become apparent from the following description of exemplary embodiments (with reference to the attached drawings).

DESCRIPTION OF THE EMBODIMENTS

Figure 1:
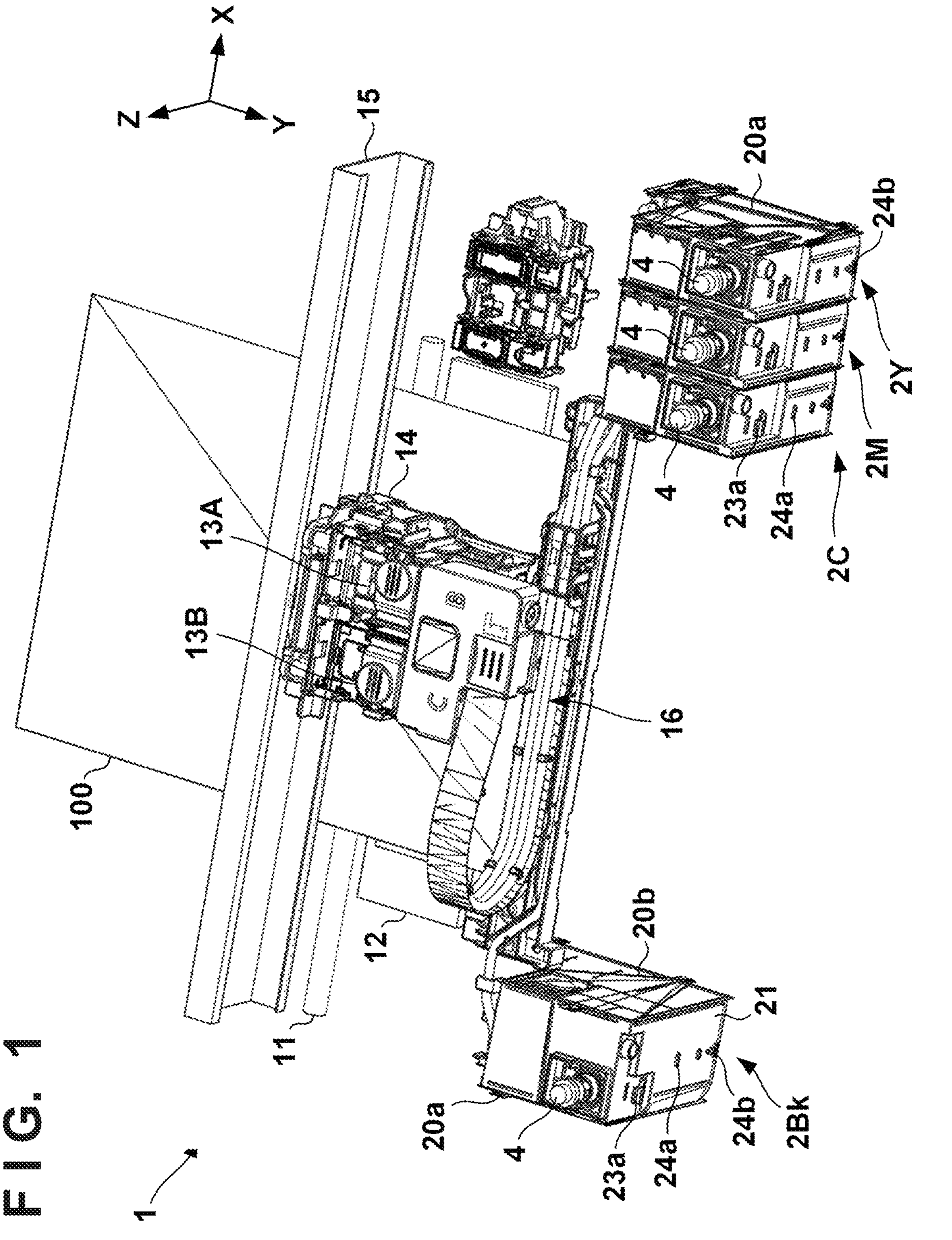
FIG. 1 is a perspective view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

"1. Outline of Printing Apparatus"

Figure 2:
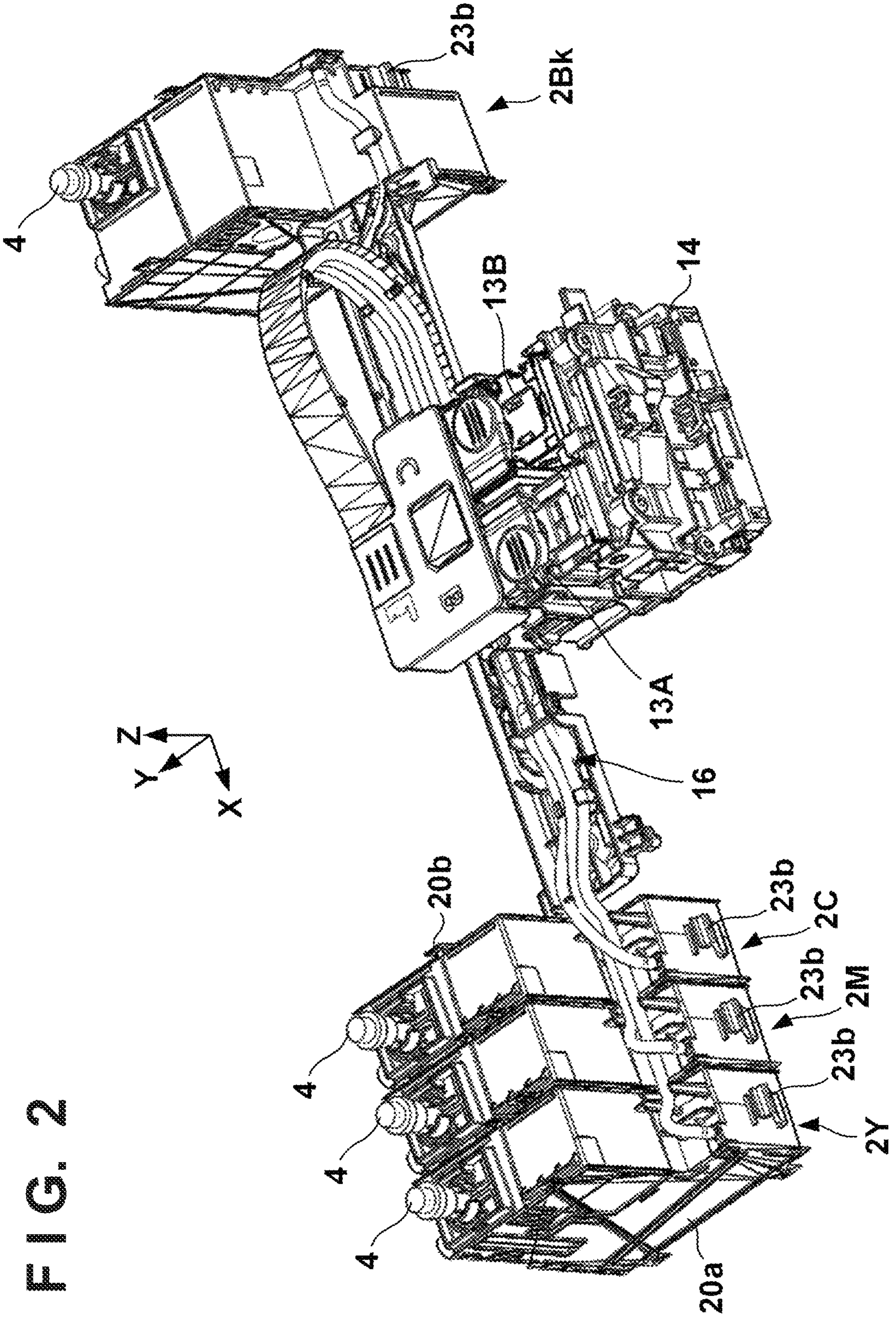
FIG. 2 is a perspective view showing a part of the printing apparatus shown in FIG. 1.

FIG. 1 is a perspective view of a printing apparatus 1 according to an embodiment of the present invention, which is viewed from the front side. FIG. 2 is a perspective view showing the configuration of a part of the printing apparatus 1 viewed from the rear side. The printing apparatus 1 according to this embodiment is an inkjet printing apparatus that performs printing on a print medium by discharging ink. In the drawings, arrows X, Y, and Z indicate directions intersecting each other, and these are orthogonal to each other in this embodiment. The arrow Z indicates a vertical direction (gravity direction). The X direction is the widthwise direction of the printing apparatus 1 (the left-and-right direction, or the widthwise direction of a print medium). The Y direction is the depth direction of the printing apparatus 1 (front-and-rear direction).

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium", cloth, a plastic film, and the like may also be used.

The printing apparatus 1 includes a conveyance roller 11 extended in the X direction. The conveyance roller 11 conveys a sheet-like print medium 100 in the Y direction (sub-scanning direction). The conveyance roller 11 is rotated by a conveyance motor (not shown) that is a driving source for the conveyance roller. When the conveyance roller 11 rotates, the print medium 100 is conveyed on a platen 12.

Ink tanks 2Bk, 2C, 2M, and 2Y (to be referred to as ink tanks 2 hereinafter generically or without distinction) are liquid containers in which liquid inks are stored. In this embodiment, the ink tank 2 is a stationary type container fixed in the printing apparatus 1. If the remaining ink amount decreases, a user replenishes ink to the ink tank 2 using a replenishing bottle 5 (to be described later) without detaching the ink tank 2 from the printing apparatus 1.

Inks of different types are stored in the four ink tanks 2. In this embodiment, inks of different colors are stored in the ink tanks 2. More specifically, black ink is stored in the ink tank 2Bk, cyan ink is stored in the ink tank 2C, magenta ink is stored in the ink tank 2M, and yellow ink is stored in the ink tank 2Y. Note that the types of inks are not limited to four types, as in this embodiment, and one type of ink may be used, or a plurality of types other than the four types may be used. The number of ink tanks 2 need only be equal to or more than the number of types of inks.

The printing apparatus 1 includes a carriage 14. The carriage 14 is a support member that supports a printhead 13A and a printhead 13B. The carriage 14 according to this embodiment can move in the X direction (main scanning direction) with the printhead 13A and the printhead 13B mounted thereon. The printhead 13A and the printhead 13B each perform printing by discharging ink to the print medium 100. The printhead 13A discharges cyan ink, magenta ink, and yellow ink supplied from the ink tanks 2C, 2M, and 2Y via tubes 16. The printhead 13B discharges black ink supplied from the ink tank 2Bk via the tube 16. The tube 16 is provided for each ink type, and the number of tubes 16 is four in this embodiment.

The lower surface of each of the printheads 13A and 13B includes a discharge surface with a plurality of nozzles for discharging ink. The discharge surface is arranged to face the platen 12. Each nozzle is provided with, for example, an electrothermal transducer (heater). When the electrothermal transducer is energized, it is heated to foam ink, and the ink is discharged by the foaming energy. A structure that discharges ink using a piezoelectric element in place of the electrothermal transducer may be used.

The carriage 14 is guided by a guide member 15 and reciprocally moved in the X direction by the driving force of a driving unit (not shown). The driving unit includes, for example, a driving pulley and a driven pulley which are arranged apart in the X direction, an endless belt wound around the pulleys, and a carriage motor that is a driving source for rotating the driving pulley. The carriage 14 is connected to the endless belt. When the endless belt is made to travel, the carriage 14 moves in the X direction.

In the process of the movement of the carriage 14, ink is discharged from each of the printhead 13A and the printhead 13B to the print medium 100 on the platen 12, thereby printing an image. This operation is sometimes called print scanning. A printing operation is performed by alternately repeating a print medium conveyance operation by the conveyance roller 11 and print scanning.

As described above, the printing apparatus 1 according to this embodiment is a serial type inkjet printing apparatus in which the printhead 13A and the printhead 13B are mounted on the carriage 14 that reciprocally moves in the X direction. However, the present invention can also be applied to another printing apparatus such as an inkjet printing apparatus including a so-called full-line printhead in which a plurality of nozzles configured to discharge ink are provided in a region corresponding to the width of a print medium.

"2. Ink Tank"

<2-1. Outline>

The ink tanks 2C, 2M, and 2Y are containers having the same structure. The ink tank 2Bk is a container that substantially has the same structure as the ink tanks 2C, 2M, and 2Y and has a larger capacity than these. For this reason, the ink tank 2Bk is a container having a larger width in the X direction than the ink tanks 2C, 2M, and 2Y. The ink tank 2Bk is arranged at the left end in the front portion of the printing apparatus 1. The ink tank 2Bk is made of a translucent material, and the user can visually recognize the remaining amount of stored ink. The ink tanks 2C to 2Y are arranged side by side in the Y direction at the right end in the front portion of the printing apparatus 1. The ink tanks 2C to 2Y are also made of a translucent material. The user can visually recognize the remaining amount of stored ink.

Figures 3A, 3B:
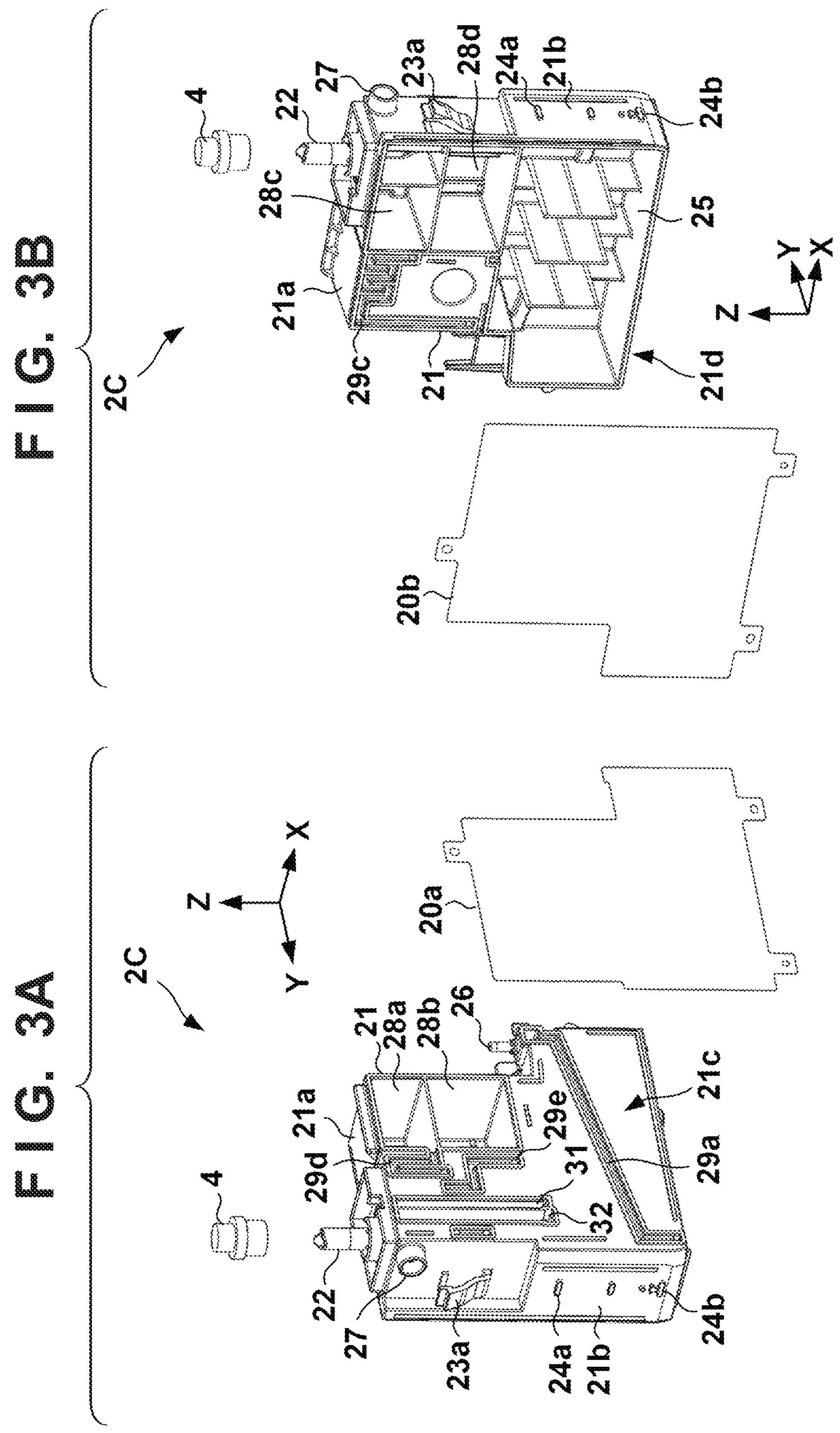
FIGS. 3A and 3B are exploded perspective views of an ink tank.
Figures 4A, 4B:
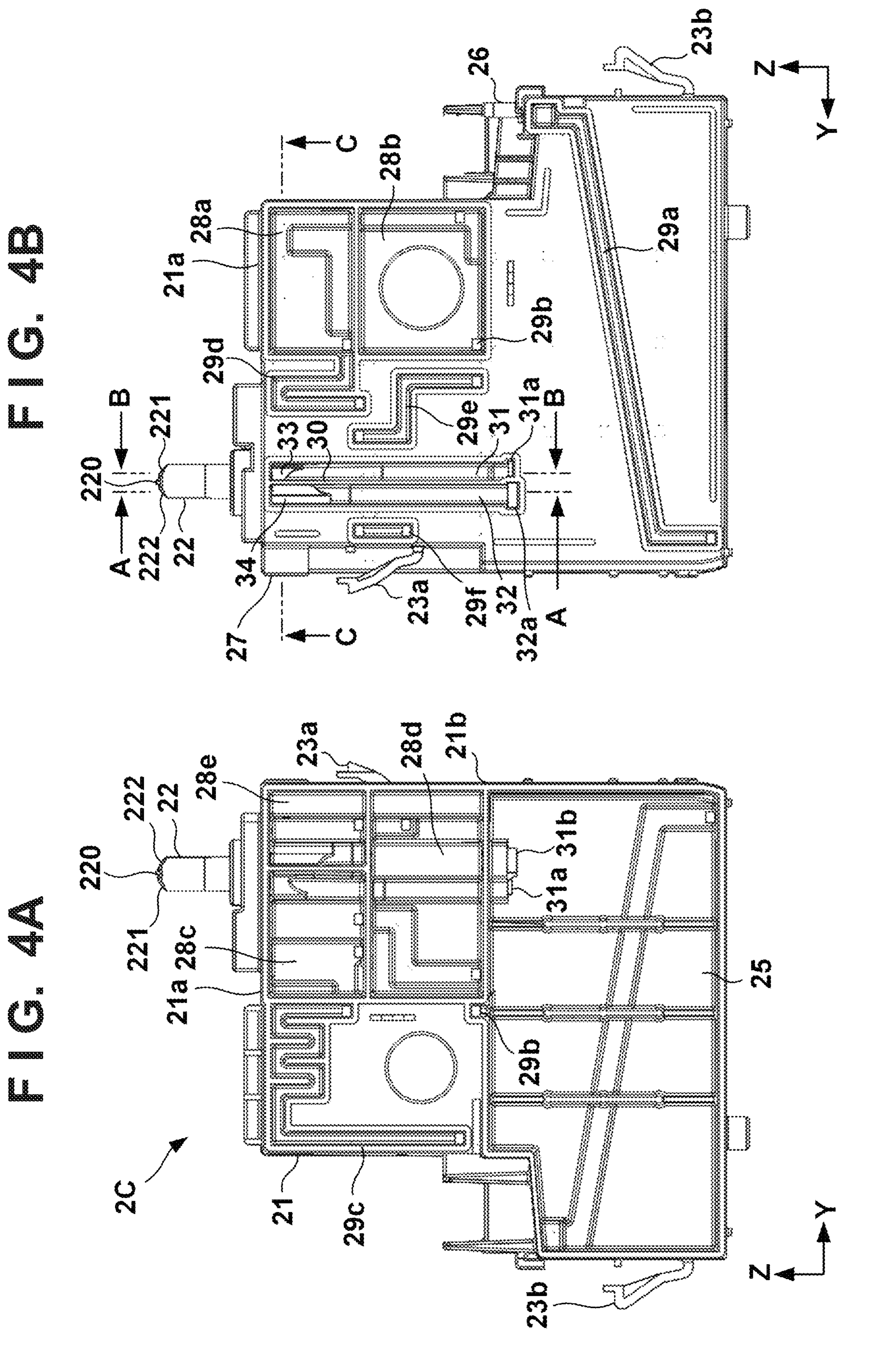
FIGS. 4A and 4B are side views of the ink tank.

The structure of the ink tanks 2 will be described using the ink tank 2C as a representative. FIGS. 3A and 3B are exploded perspective views of the ink tank 2C. FIGS. 4A and 4B are side views of the ink tank 2C. FIG. 4A shows a side portion 21*d*, and FIG. 4B shows a side portion 21*c*.

The ink tank 2C has an L outer shape as a whole. The ink tank 2C includes a main body 21, and left and right sealing members 20*a* and 20*b*. The main body 21 is a container main body including a top portion 21*a*, a front portion 21*b*, and the left and right side portions 21*c* and 21*d*, and is a hollow structure made of a resin. The sealing members 20*a* and 20*b* according to this embodiment are flexible films and are fixed to the side portions 21*c* and 21*d* of the main body 21 by adhesion or welding. The sealing members 20*a* and 20*b* cover and seal openings and grooves of the side portions 21*c* and 21*d* of the main body 21. All the main body 21 and the sealing members 20*a* and 20*b* are translucent members. These members may be colored transparent or colorless transparent.

A needle 22 projects upward from the top portion 21*a* of the ink tank 2C. The needle 22 is a tubular member formed integrally with the main body 21 and extending in the Z direction, and forms a channel used to inject replenishing ink from the outside into the ink tank 2C. A detachable cap 4 is attached to the distal end (upper end) of the needle 22.

A tubular outlet portion 26 is formed on the rear portion of the ink tank 2C. The outlet portion 26 is the outlet for the ink stored in the ink tank 2C, and is a liquid outlet used to make the ink flow to the printhead 13A. The tube 16 is connected to the outlet portion 26, and the ink stored in the ink tank 2C is supplied from the outlet portion 26 to the printhead 13A via the tube 16.

A lower limit indicator 24*b* roughly indicating the lower limit of a remaining amount serving as an ink replenishing timing and an upper limit indicator 24*a* roughly indicating the upper limit when replenishing ink are formed on the front portion 21*b*. The upper limit indicator 24*a* and the lower limit indicator 24*b* are formed by the shape of the main body 21 (by forming a concave portion or a convex portion) or by printing a chart.

An engaging portion 23*a* is formed on the front portion 21*b* of the ink tank 2C, and an engaging portion 23*b* is formed on the rear portion. The engaging portions 23*a* and 23*b* engage with engaging portions (not shown) formed on the housing (not shown) of the printing apparatus 1, thereby fixing and positioning the ink tank 2C.

The ink tank 2C includes, on the side of the bottom portion, a storage portion 25 that stores ink. The storage portion 25 is defined by a space opening to the side portion 21*d* of the main body 21 and the sealing member 20*b*. The storage portion 25 communicates with the needle 22 via channels 31 and 32. The channels 31 and 32 are defined by grooves opening to the side portion 21*c* of the main body 21 and the sealing member 20*a*. The outlet portion 26 is formed to be higher than the liquid surface of ink when a maximum amount of ink is stored in the storage portion 25.

The storage portion 25 and the outlet portion 26 communicate with the other via a channel 29*a*. The channel 29*a* is defined by a groove opening to the side portion 21*c* of the main body 21 and the sealing member 20*a*. Ink stored in the storage portion 25 is supplied to the printhead 13A via the channel 29*a*, the outlet portion 26, and the tube 16.

An air communicating port 27 is formed in the front portion 21*b* that is the front side portion of the ink tank 2C. The air communicating port 27 opens to the front side of the ink tank 2C in the Y direction. Since an upward opening is not formed, a foreign substance hardly closes the air communicating port 27. The air communicating port 27 communicates with the storage portion 25 via buffer chambers 28*a* to 28*e* and channels 29*b* to 29*f*. Even if the ink tank 2C is placed in a posture different from that in use time, the ink in the storage portion 25 is prevented from leaking from the air communicating port 27.

The buffer chambers 28*a* and 28*b* are defined by spaces opening to the side portion 21*c* of the main body 21 and the sealing member 20*a*. The buffer chambers 28*c* to 28*e* are defined by spaces opening to the side portion 21*d* of the main body 21 and the sealing member 20*b*. The channel 29*c* is defined by a groove opening to the side portion 21*d* of the main body 21 and the sealing member 20*b*. The channels 29*d* to 29*f* are defined by grooves opening to the side portion 21*c* and the sealing member 20*a*.

One of the two end portions of the channel 29*b* opens to the storage portion 25, and the other opens to the buffer chamber 28*b*. The storage portion 25 and the buffer chamber 28*b* communicate via the channel 29*b*. One of the two end portions of the channel 29*c* opens to the buffer chamber 28*a*, and the other opens to the buffer chamber 28*b*. The buffer chamber 28*a* and the buffer chamber 28*b* communicate via the channel 29*c*. One of the two end portions of the channel 29*d* opens to the buffer chamber 28*a*, and the other opens to the buffer chamber 28*c*. The buffer chamber 28*a* and the buffer chamber 28*c* communicate via the channel 29*d*. One of the two end portions of the channel 29*e* opens to the buffer chamber 28*c*, and the other opens to the buffer chamber 28*d*. The buffer chamber 28*c* and the buffer chamber 28*d* communicate via the channel 29*e*. One of the two end portions of the channel 29*f* opens to the buffer chamber 28*d*, and the other opens to the buffer chamber 28*e*. The buffer chamber 28*d* and the buffer chamber 28*e* communicate via the channel 29*f*. The buffer chamber 28*e* communicates with the air communicating port 27.

If the printing apparatus 1 is left stand for a long time in a posture other than that in use time, and the atmospheric pressure/temperature changes in that state, it is considered that air in the ink tank 2C expands or shrinks. A mechanism that suppresses ink leakage from the air communicating port 27 in this state will be described using, as an example, a state in which the maximum amount of ink is stored in the storage portion 25 for storing ink.

Assume a case where the printing apparatus 1 is in a posture with the sealing member 20*a* located on the lower side and the sealing member 20*b* located on the upper side. The ink liquid surface is located on the lower side of the channel 29*b* that makes the storage portion 25 and the buffer chamber 28*b* communicate. Since the interior of the ink tank 2C communicates with the exterior of the ink tank 2C, the ink never flows from the channel 29*b* into the buffer chamber 28*b*. For this reason, the ink never leaks from the air communicating port 27.

Next, assume a case where the printing apparatus 1 is in a posture with the sealing member 20*a* located on the upper side and the sealing member 20*b* located on the lower side. The ink liquid surface is located at a position higher than the channel 29*b* that makes the storage portion 25 and the buffer chamber 28*b* communicate. Hence, the ink flows from the storage portion 25 to the buffer chamber 28*b*. Also, since the buffer chamber 28*b* communicates with the buffer chamber 28*a* via the channel 29*c*, the ink flows to the buffer chamber 28*a* via the channel 29*b*, the buffer chamber 28*b*, and the channel 29*c*. However, the end portion of the channel 29*d* that makes the buffer chamber 28*a* and the buffer chamber 28*c* communicate is located on the surface covered with the sealing member 20*a*. Hence, the ink does not flow to the next channel 29*d* and the buffer chamber 28*c* unless the buffer chamber 28*a* is filled with the ink. Since the buffer chambers 28*c* and 28*d* have similar configurations, the risk that the ink leaks from the air communicating port 27 is low.

Next, assume a case where the printing apparatus 1 is in a posture with its top and bottom portions being inverted. Since the ink liquid surface is located at a position higher than the channel 29*b* that makes the storage portion 25 and the buffer chamber 28*b* communicate, the ink flows to the buffer chamber 28*b*. In this posture, the end portion of the channel 29*c* in the buffer chamber 28*b* is located on the upper side of the buffer chamber 28*b*. For this reason, the ink does not flow to the buffer chamber 28*a* via the channel 29*c* unless the buffer chamber 28*b* is filled with the ink. Since the buffer chambers 28*a* and 28*c* have similar configurations, the risk that the ink leaks from the air communicating port 27 is low.

Next, assume a case where the printing apparatus 1 is in a posture with its front portion located on the lower side. In this posture, the ink tank 2C is in a posture with the air communicating port 27 facing downward. Since the channel 29*b* is located on the lower side of the ink liquid surface, the ink flows to the buffer chamber 28*b* via the channel 29*b*. In this posture, the end portion of the channel 29*c* in the buffer chamber 28*b* is located on the upper side of the buffer chamber 28*b*. For this reason, the ink does not flow to the buffer chamber 28*a* via the channel 29*c* unless the buffer chamber 28*b* is filled with the ink. In addition, even if the buffer chamber 28*b* is filled with the ink, an ink amount that causes the ink liquid surface in the storage portion 25 to be located on the lower side of the channel 29*b* can be stored in other buffer chambers. Hence, the risk that the ink leaks from the air communicating port 27 is low.

Finally, assume a case where the printing apparatus 1 is in a posture with its rear portion located on the lower side. The ink tank 2C is in a posture with the air communicating port 27 facing upward. This posture is the same as that when the printing apparatus 1 is in a posture with the sealing member 20*a* located on the upper side and the sealing member 20*b* located on the lower side. That is, the ink does not flow to the next buffer chamber 28*c* unless the buffer chamber 28*a* is filled with the ink. Since the buffer chambers 28*c* and 28*d* have similar configurations, the risk that the ink leaks from the air communicating port 27 is low.

As described above, in this embodiment, even if the printing apparatus 1 is left stand for a long time in a posture different from that in use time, and the atmospheric pressure/temperature changes, the risk of ink flow-out can be reduced, and ink leakage from the air communicating port 27 can be suppressed.

<2-2. Channel Structure>

Figure 5B:
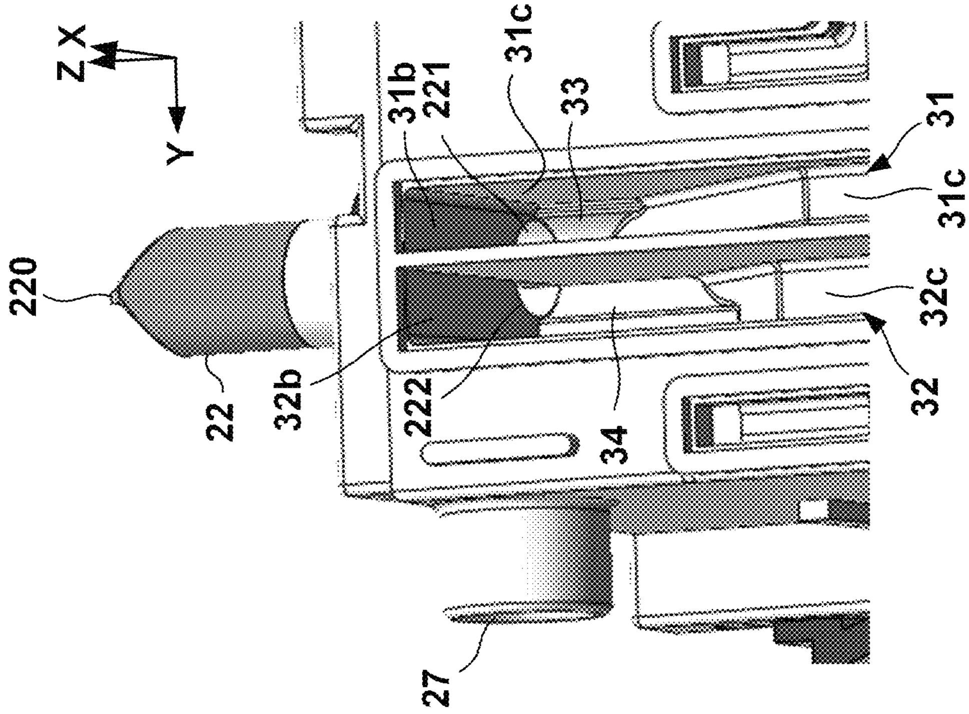
FIGS. 5A and 5B are partial perspective views of the ink tank.
Figure 5A:
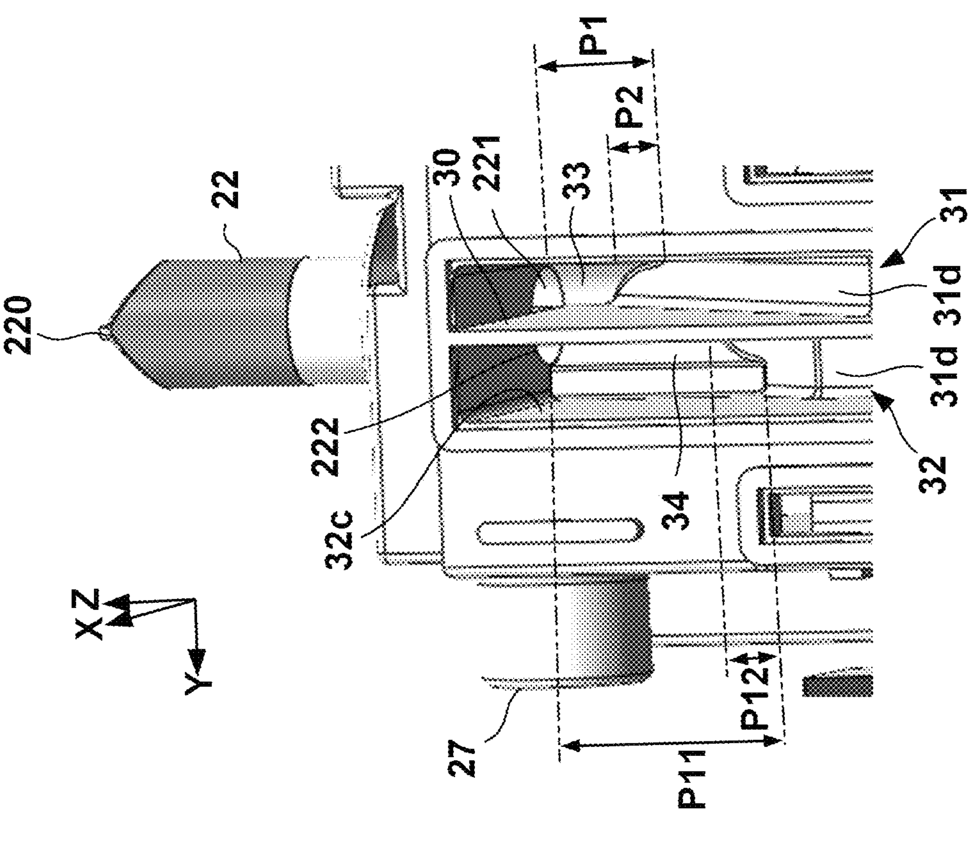
Figure 6B:
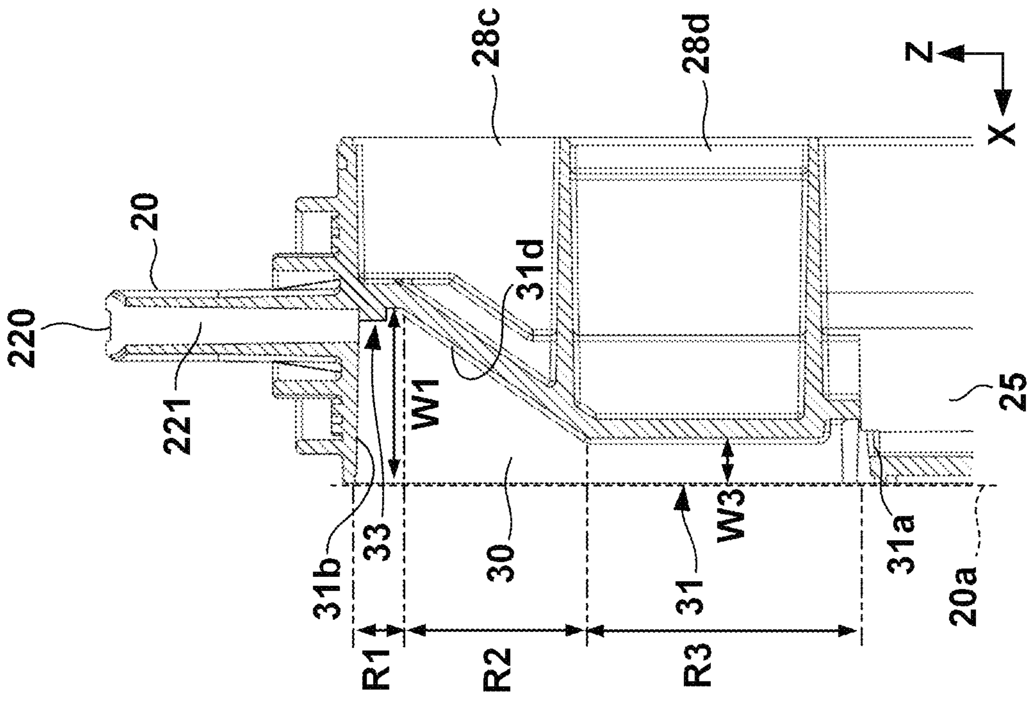
FIG. 6B is a sectional view taken along a line B-B in FIG. 4B.
Figure 6A:
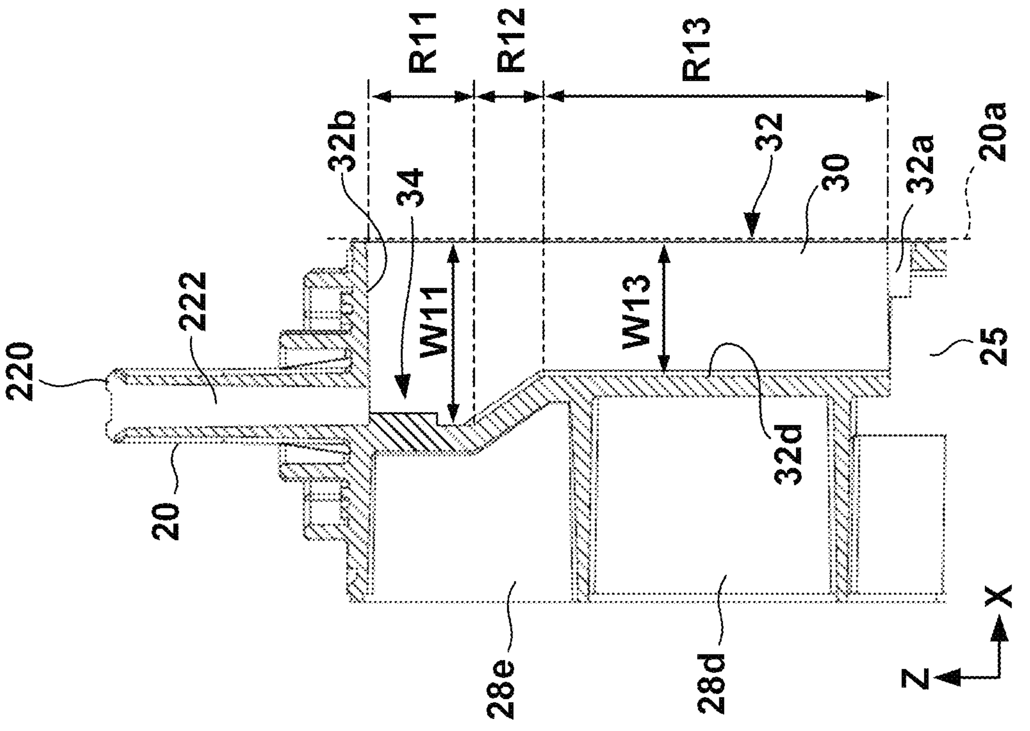
FIG. 6A is a sectional view taken along a line A-A in FIG. 4B.
Figure 7:
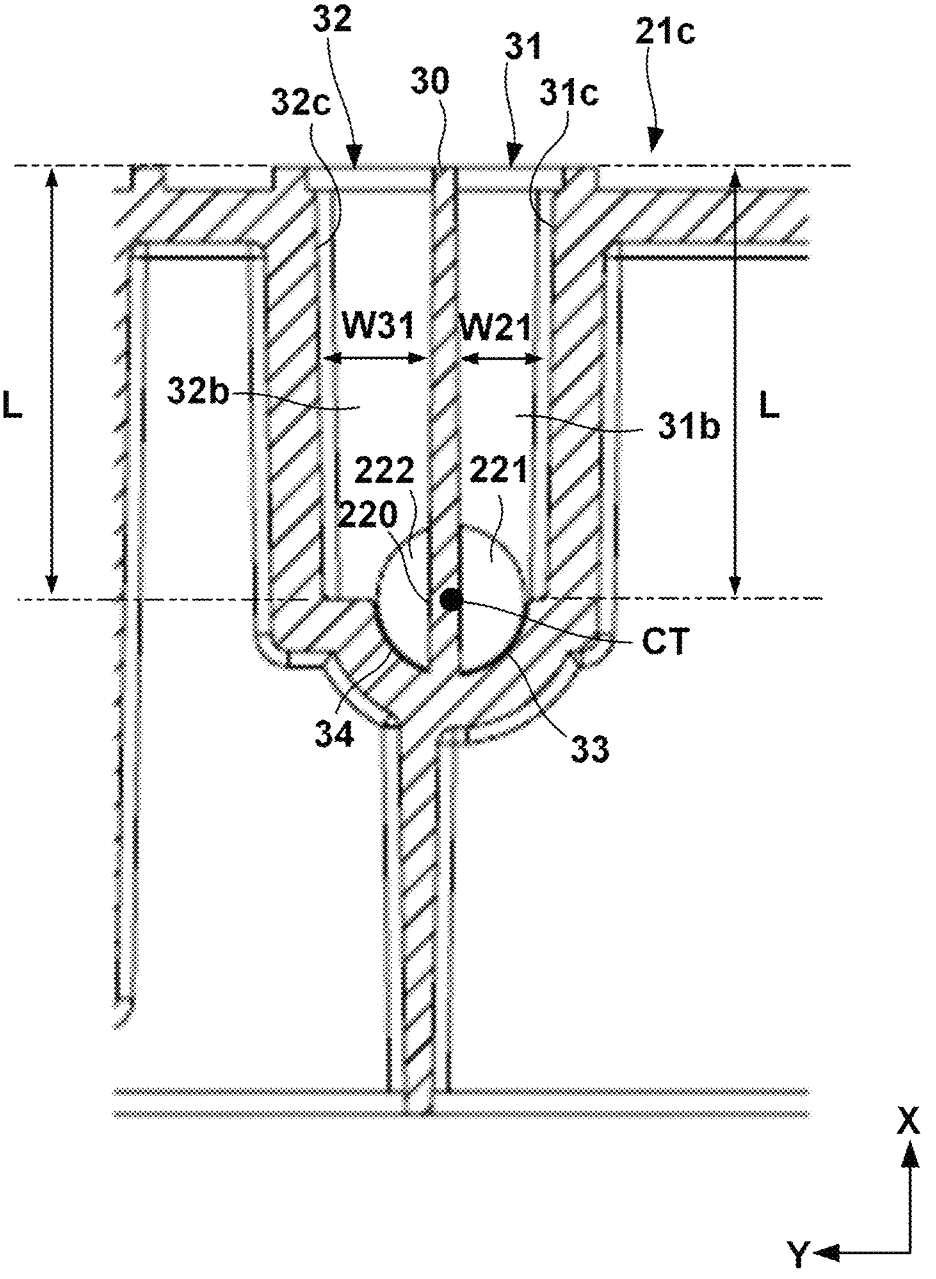
FIG. 7 is a sectional view taken along a line C-C in FIG. 4B.

The structures of the needle 22 and the channels 31 and 32 will be described with reference to FIGS. 5A to 7 in addition to FIGS. 3A to 4B. FIGS. 5A and 5B are perspective views showing a part of the ink tank 2C, and particularly show the boundary portion between the needle 22 and the channels 31 and 32. FIG. 6A is a sectional view taken along a line A-A in FIG. 4B, and FIG. 6B is a sectional view taken along a line B-B in FIG. 4B. FIG. 7 is a sectional view taken along a line C-C in FIG. 4B.

The needle 22 has a cylindrical outer shape extending in the Z direction. The internal space of the needle 22 is divided by a partition wall 220, and a channel 221 and a channel 222 are formed. The partition wall 220 is a plate on the X-Z plane. Both the channels 221 and 222 are channels extended in the Z direction, and their channel direction is the Z direction. The distal end (upper end) of the needle 22 has a mountain shape. Both the opening portions (the opening portions on the side of the replenishing bottle 5) of the distal ends (upper ends) of the channels 221 and 222 open obliquely with respect to the channel direction. In other words, the end face of the formation portion of the channel 221 and the end face of the formation portion of the channel 222 in the needle 22 tilt at an angle within the range of 30° to 60° with respect to the X-Y plane. This suppresses formation of a liquid film of ink in the opening portions due to the surface tension of ink and improve the flow of ink at the time of ink replenishing.

As shown in FIG. 7, the partition wall 220 is located at a position deviated from a center axis CT of the needle 22 to the front side in the Y direction. The sectional shape (the sectional shape on the X-Y plane) of each of the channels 221 and 222 is a fan shape. The channel 221 and the channel 222 have different sectional areas, and the sectional area of the channel 221 is larger than that of the channel 222. The flow amount of ink at the time of replenishing can be larger in the channel 221 than in the channel 222. The sectional shape of the channel 221 at an arbitrary position in the Z direction is the same except the tilting portion at the distal end of the needle 22. The sectional shape of the channel 222 at an arbitrary position in the Z direction is also the same, except the tilting portion at the distal end of the needle 22. At an arbitrary position in the Z direction including the distal end of the needle 22, the channel 221 and the channel 222 have different sectional areas, and the sectional area is larger in the channel 221 than in the channel 222.

The channel 31 and the channel 32 are extended in the Z direction and are adjacent to each other in the Y direction. The channel 31 and the channel 32 are partitioned by a partition wall 30 in the Y direction. The partition wall 30 is a plate on the X-Z plane, which is formed continuing to the partition wall 220 of the needle 22.

The channel 31 is formed between the channel 221 and the storage portion 25 and communicates with these. The channel 31 includes, at the end portion on the side of the storage portion 25, an opening portion 31*a* opening to the storage portion 25. In addition, the channel 221 opens to an upper end face 31*b*.

The channel 31 is defined by the partition wall 30, an inner wall surface 31*c* facing the partition wall 30, the sealing member 20*a*, and an inner wall surface (the bottom portion of the groove) 31*d* facing the sealing member 20*a*. The channel 31 includes a shape portion 33 formed at the end portion on the side of the channel 221. The partition wall 30 and the inner wall surface 31*c* are parallel. The sectional shape (the sectional shape on the X-Y plane) of the channel 31 orthogonal to the channel direction is a rectangular shape except the portion of the shape portion 33. On the upper end face 31*b*, the channel 221 opens at a position closer to the inner wall surface 31*d* than the sealing member 20*a*.

The width of the channel 31 in the X direction changes depending on the position in the Z direction. The channel 31 has a width W1 in a region R1 on the side of the needle 22, and a width W3 (<W1) in a region R3 on the side of the storage portion 25. The regions R1 and R3 are each a uniform portion having the same width. In an intermediate region R2, the width in the X direction continuously changes. The region R2 is a changing portion whose width decreases along with approach to the storage portion 25. A width W21 of the channel 31 in the Y direction is the same at an arbitrary position in the Z direction.

The shape portion 33 is formed at the end portion (the end portion on the side of the channel 221) of the channel 31. The shape portion 33 has a sectional shape common to a part of the sectional shape of the channel 221. More specifically, in the shape portion 33, a sectional shape having an arc concentric with respect to the center axis CT, which is common to a part of the arc of the fan shape that is the sectional shape of the channel 221, is formed continuously from the channel 221. The shape portion 33 is formed downward from the upper end face 31*b* in the Z direction within the range of a section P1.

When viewed in the X direction, the shape portion 33 is formed to the far side from a position apart by a distance L from the side portion 21*c* of the main body 21. The arc portion of the sectional shape of the channel 221 is an arc within the range of about 180°, and the arc of the sectional shape of the shape portion 33 is an arc within the range of about 90°. Within the range of 90°, the inner wall surface of the channel continues from the channel 221 to the channel 31.

As is apparent from FIG. 7, the sectional area of the channel largely changes between the channel 221 and the channel 31, and the pressure loss of a fluid readily occurs. The pressure loss of the fluid is reduced by providing the shape portion 33 and partially maintaining the shape of the channel 221 even in the channel 31. This can reduce the resistance to the ink passing through the boundary between the channel 221 and the channel 31 and improve the flow-in speed of the ink at the time of ink replenishing. In particular, the channel 221 and the channel 31 sometimes have different shapes due to constraints on molding of the main body 21 or ink replenishing efficiency. In this case, the shape portion 33 is effective in reducing the pressure loss of the fluid at the boundary portion between the channels.

In a section P2 of the section P1, the portion of the shape portion 33 having an arc sectional shape gradually becomes small downward in the Z direction. When the shape is gradually made to match from the shape portion 33 to the inner wall surface 31*d*, generation of the resistance to the flow of ink can be reduced.

Next, the channel 32 is defined by the partition wall 30, an inner wall surface 32*c* facing the partition wall 30, the sealing member 20*a*, and an inner wall surface (the bottom portion of the groove) 32*d* facing the sealing member 20*a*. The channel 32 includes a shape portion 34 formed at the end portion on the side of the channel 222. The partition wall 30 and the inner wall surface 32*c* are parallel. The sectional shape (the sectional shape on the X-Y plane) of the channel 32 orthogonal to the channel direction is a rectangular shape except the portion of the shape portion 34. On an upper end face 32*b*, the channel 222 opens at a position closer to the inner wall surface 32*d* than the sealing member 20*a*.

The width of the channel 32 in the X direction changes depending on the position in the Z direction. The channel 32 has a width W11 in a region R11 on the side of the needle 22, and a width W13 (<W11) in a region R13 on the side of the storage portion 25. The regions R11 and R13 are each a uniform portion having the same width. In an intermediate region R12, the width in the X direction continuously changes. The region R12 is a changing portion whose width decreases along with approach to the storage portion 25. A width W22 of the channel 32 in the Y direction is the same at an arbitrary position in the Z direction.

The shape portion 34 is formed at the end portion (the end portion on the side of the channel 222) of the channel 32. The shape portion 34 has a sectional shape common to a part of the sectional shape of the channel 222. More specifically, in the shape portion 34, a sectional shape having an arc concentric with respect to the center axis CT, which is common to a part of the arc of the fan shape that is the sectional shape of the channel 222, is formed continuously from the channel 222. The shape portion 34 is formed downward from the upper end face 32*b* in the Z direction within the range of a section P11.

When viewed in the X direction, the shape portion 34 is formed to the far side from a position apart by the distance L from the side portion 21*c* of the main body 21. The arc portion of the sectional shape of the channel 222 is an arc within the range of about 180°, and the arc of the sectional shape of the shape portion 34 is an arc within the range of about 90°. Within the range of 90°, the inner wall surface of the channel continues from the channel 222 to the channel 32.

As is apparent from FIG. 7, the sectional area of the channel largely changes between the channel 222 and the channel 32, and the pressure loss of a fluid readily occurs. The pressure loss of the fluid is reduced by providing the shape portion 34 and partially maintaining the shape of the channel 222 even in the channel 32. This can reduce the resistance to the ink passing through the boundary between the channel 222 and the channel 32 and improve the flow-in speed of the ink at the time of ink replenishing. In particular, the channel 222 and the channel 32 sometimes have different shapes due to constraints on molding of the main body 21 or ink replenishing efficiency. In this case, the shape portion 34 is effective in reducing the pressure loss of the fluid at the boundary portion between the channels.

In a section P12 of the section P11, the portion of the shape portion 34 having an arc sectional shape gradually becomes small downward in the Z direction. When the shape is gradually made to match from the shape portion 34 to the inner wall surface 32*d*, generation of the resistance to the flow of ink can be reduced.

When the channel 31 and the channel 32 are compared, W1=W11, W3<W13, the length of R2 in the Z direction>the length of R12 in the Z direction, and the length of R3 in the Z direction>the length of R13 in the Z direction. Note that the channel 31 and the channel 32 have the same length in the Z direction. In addition, W21<W31.

When the entire capacity is compared between the channel 31 and the channel 32, the entire capacity of the channel 32 is larger than that of the channel 31. When the sectional area (on the X-Y plane) at an arbitrary position in the Z direction is compared between the channel 31 and the channel 32, the sectional area of the channel 32 is larger than that of the channel 31. Also, the opening area of the opening portion 31*a*<the opening area of an opening portion 32*a*. The change of the sectional area at the boundary between the channel 222 and the channel 32 is larger than the change of the sectional area at the boundary between the channel 221 and the channel 31.

When the shape portion 33 and the shape portion 34 are compared, the length of the section P1 in the Z direction<the length of the section P11 in the Z direction. When viewed in the X direction, both the shape portions 33 and 34 are formed to the far side from the position apart by the distance L from the side portion 21*c* of the main body 21, and the sectional area of the channel 221 is larger than the sectional area of the channel 222. Hence, the contour length of the sectional shape of the shape portion 33 common to the channel 221 (the arc length within the range of about 90° in FIG. 7) is longer than the contour length of the sectional shape of the shape portion 34 common to the channel 222 (the arc length within the range of about 90° in FIG. 7).

When the set of the channel 221 and the channel 31 of the needle 22 and the set of the channel 222 and the channel 32 of the needle 22 are compared, these have the following characteristics. A larger amount of ink readily flows through the channel 221 because its sectional area is larger than that of the channel 222. On the other hand, the ink amount that the channel 31 can hold is small because the sectional area and the capacity of the channel 31 are smaller than those of the channel 32. A liquid film is readily formed on the opening portion 31*a* of the channel 31 due to generation of a surface tension because the opening area is smaller than that of the opening portion 32*a* of the channel 32.

"3. Replenishing Bottle"

Figure 8:
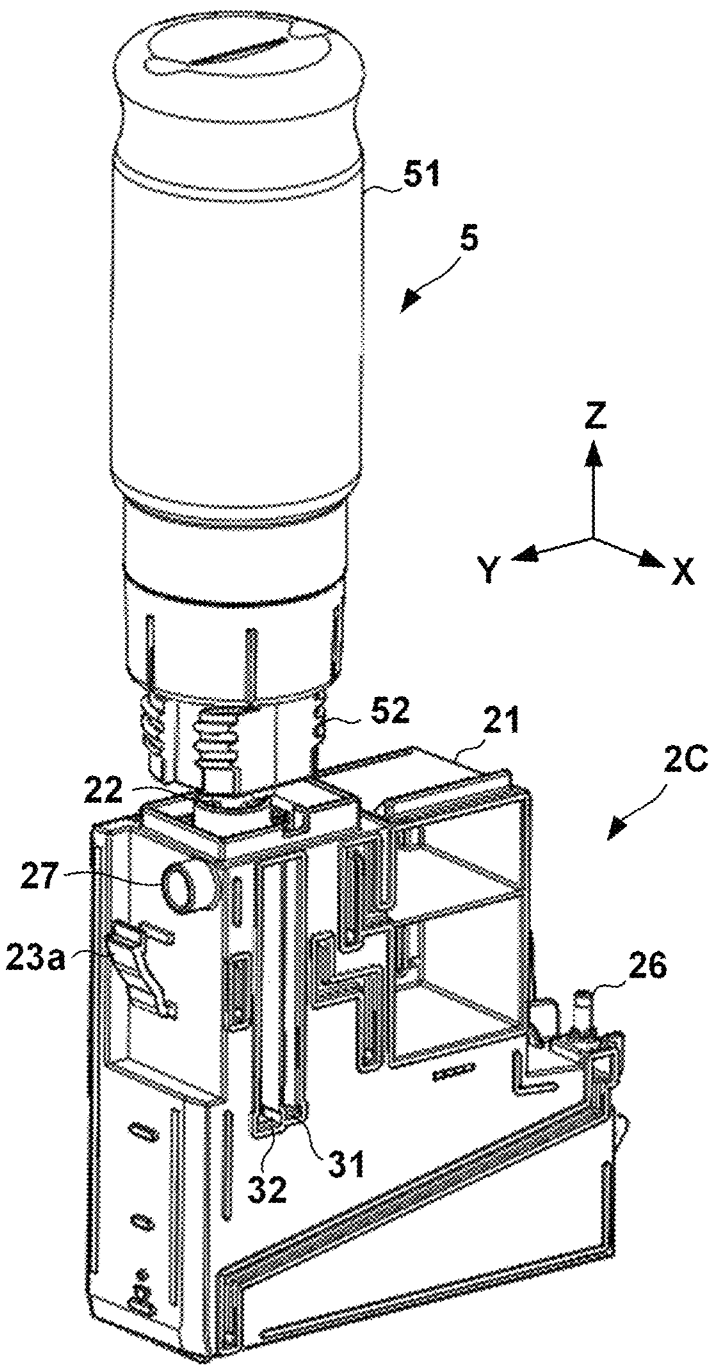
FIG. 8 is an explanatory view of a use method of a replenishing bottle.
Figure 9A:
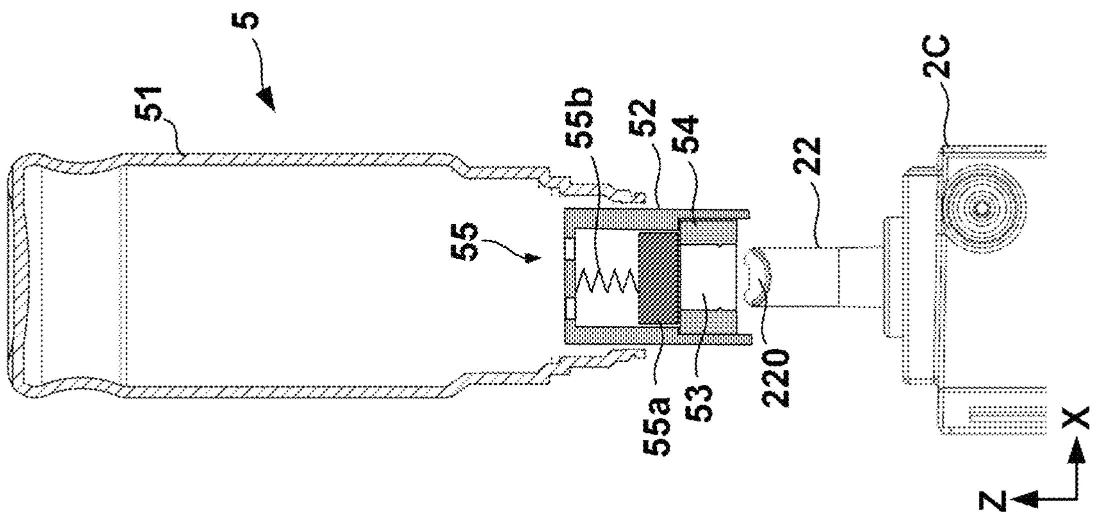
FIGS. 9A to 9C are explanatory views of a use method of a replenishing bottle.
Figure 9B:
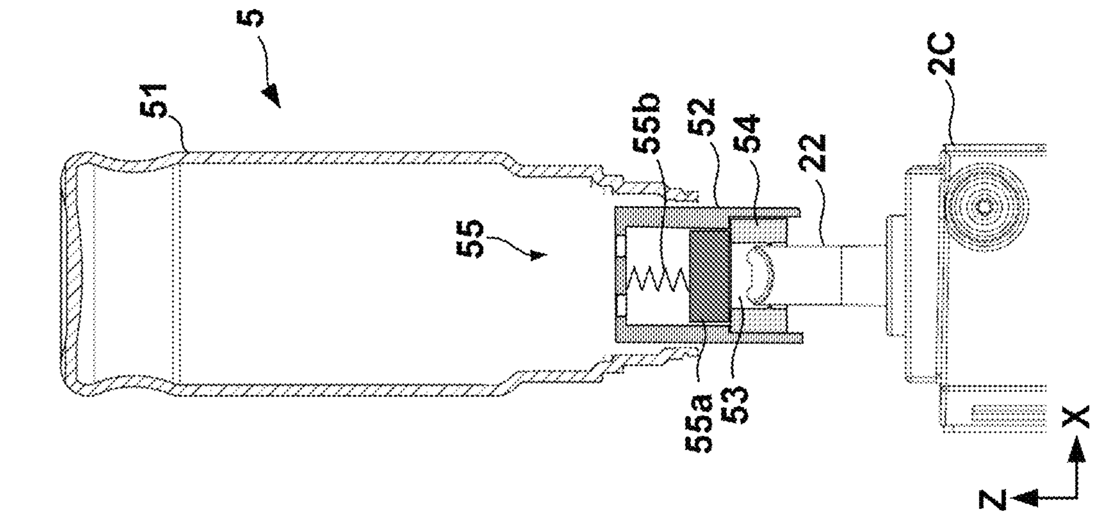
Figure 9C:
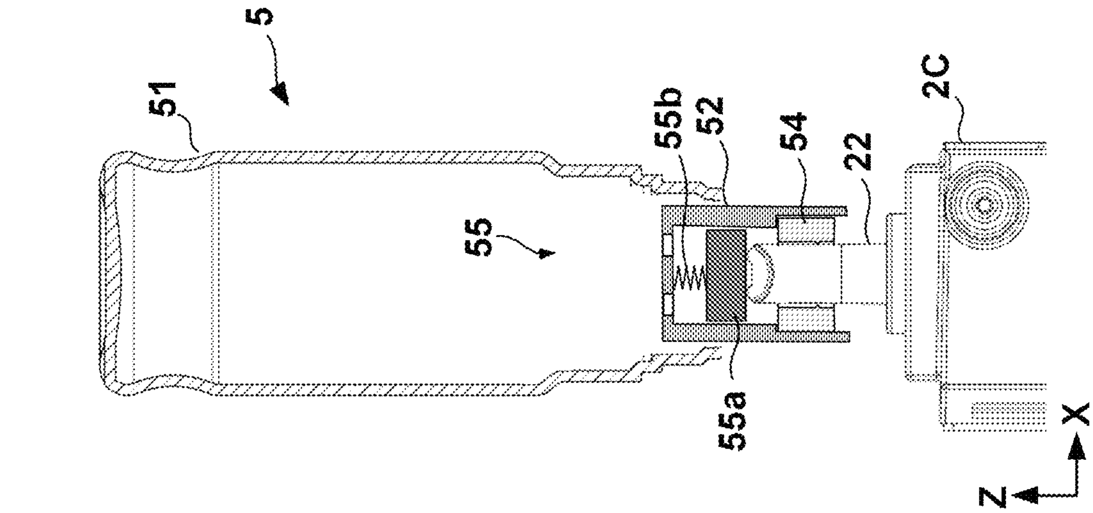

FIG. 8 is a view showing a replenishing mode in which the replenishing bottle 5 is attached to the ink tank 2C. FIGS. 9A to 9C are views showing the attachment procedure of the replenishing bottle 5 to the ink tank 2C. The replenishing bottle 5 is a bottle configured to replenish ink. The replenishing bottle 5 is provided for each ink type, and replenishes ink to the ink tank 2 of corresponding ink. The replenishing bottle 5 shown in FIGS. 8 to 9C is a bottle for cyan ink. Replenishing bottles corresponding to other types of inks have similar structures.

The replenishing bottle 5 includes a storage portion 51 that stores ink, and a closing member 52 fixed to an end portion of the storage portion 51. The storage portion 51 is a container having a cylindrical shape with one end portion open, and the closing member 52 is fixed to the storage portion 51 to close the open end portion.

An insertion hole 53 configured to receive the needle 22 is formed in the closing member 52. The insertion hole 53 communicates with the storage portion 51 via a valve 55. A seal member 54 is provided around the insertion hole 53. The valve 55 includes an opening/closing member 55*a* that is movably provided, and a spring 55*b* configured to bias the opening/closing member 55*a* in a closing direction. By the bias of the spring 55*b*, the opening/closing member 55*a* is located at a closing position where the opening/closing member 55*a* contacts the seal member 54 to block the communication between the insertion hole 53 and the storage portion 51.

An ink replenishing work using the replenishing bottle 5 will be described. Here, a case where cyan ink is replenished to the ink tank 2C will be described. The user prepares the replenishing bottle 5 that stores cyan ink. The user also detaches the cap 4 from the needle 22 of the ink tank 2C. As shown in FIG. 9A, the replenishing bottle 5 in a vertical posture with the side of the closing member 52 facing downward is attached to the ink tank 2C such that the needle 22 is inserted into the insertion hole 53.

FIG. 9B shows a state in which the replenishing bottle 5 is pushed to the side of the ink tank 2C, and the needle 22 begins being inserted into the insertion hole 53. At the stage shown in FIG. 9B, the needle 22 does not reach the opening/closing member 55*a* yet, and the valve 55 remains a closed state.

FIG. 9C shows a stage when the attachment of the replenishing bottle 5 is completed. The needle 22 pushes the opening/closing member 55*a* up against the biasing force of the spring 55*b*, and the opening/closing member 55*a* is displaced to an opening position apart from the seal member 54. The valve 55 changes to an open state, and the storage portion 51 and the channel 221 and the channel 222 of the needle 22 communicate. The cyan ink in the storage portion 51 flows from the channels 221 and 222 to the ink tank 2C.

When the ink replenishing ends, the replenishing bottle 5 is detached from the ink tank 2C. The detachment work is done in accordance with a procedure reverse to that at the time of attachment. When the replenishing bottle is pulled up from the state shown in FIG. 9C, the needle 22 separates from the opening/closing member 55*a*, and therefore, the state returns to the state shown in FIG. 9A. By the bias of the spring 55*b*, the opening/closing member 55*a* returns to the closing position, and the valve 55 returns to the closed state. Hence, the cyan ink in the storage portion 51 never flows out from the insertion hole 53.

"4. Flow of Ink in Replenishing"

A behavior that ink flows from the replenishing bottle 5 to the storage portion 25 via the channels 221 and 222 of the needle 22 and the channels 31 and 32 in the state shown in FIG. 9C will be described with reference to FIGS. 10A to 13C. FIGS. 10A, 11A, 12A, and 13A correspond to sectional views taken along the line A-A in FIG. 4B and schematically show the flow of ink in the channels 222 and 32. FIGS. 10C, 11C, 12C, and 13C correspond to sectional views taken along the line B-B in FIG. 4B and schematically show the flow of ink in the channels 221 and 31. FIGS. 10B, 11B, 12B, and 13B correspond to side views of the ink tank near the channels 31 and 32.

Figure 10C:
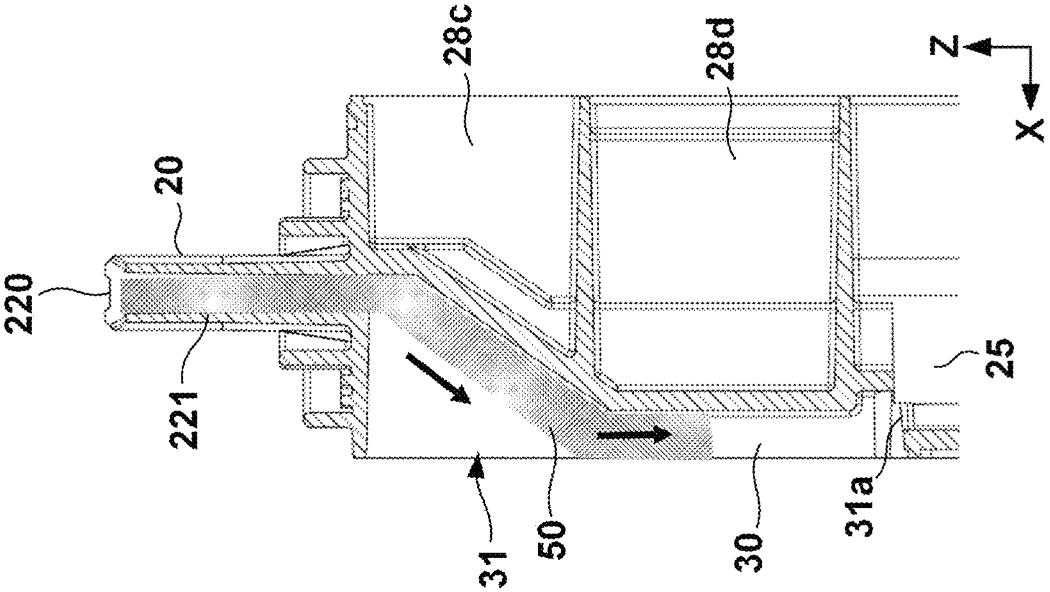
FIGS. 10A to 10C are schematic views showing the flow of ink when replenishing ink.
Figure 10B:
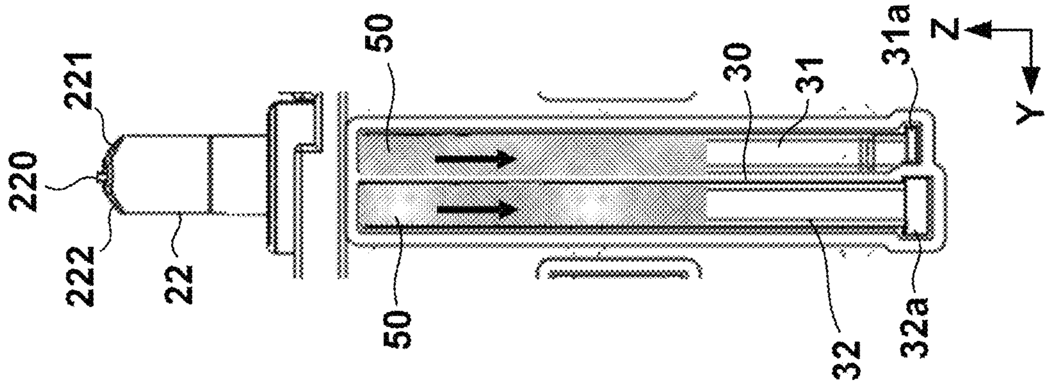
Figure 10A:
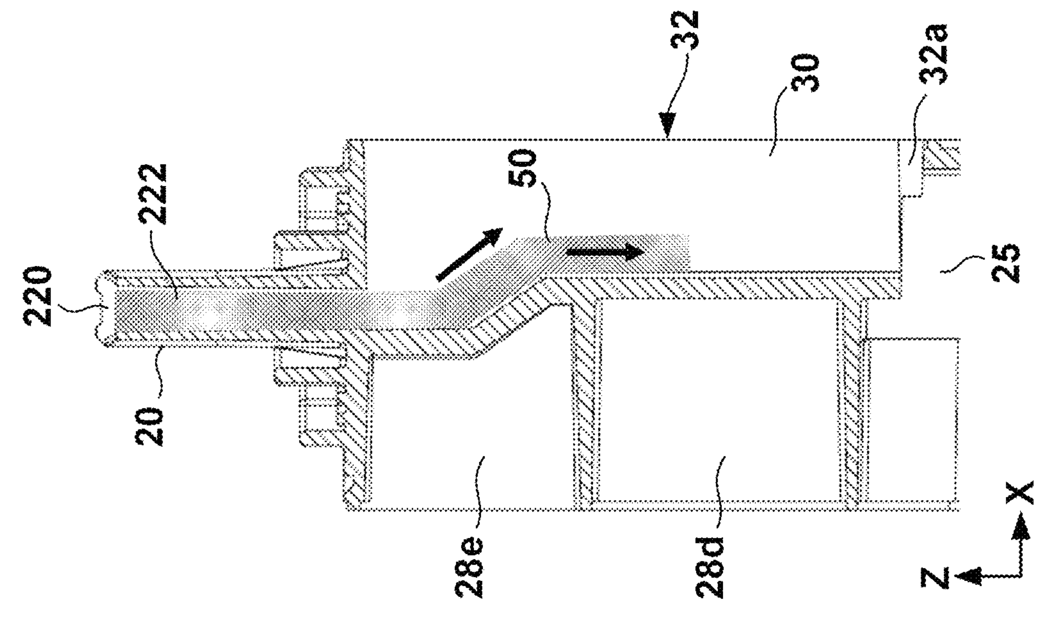
Figure 11C:
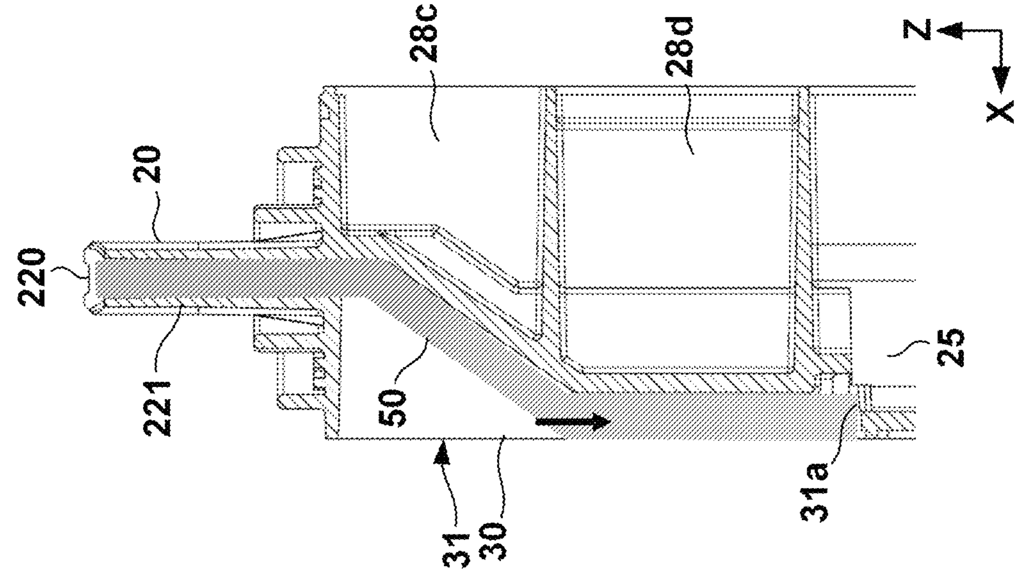
FIGS. 11A to 11C are schematic views showing the flow of ink when replenishing ink.
Figure 11B:
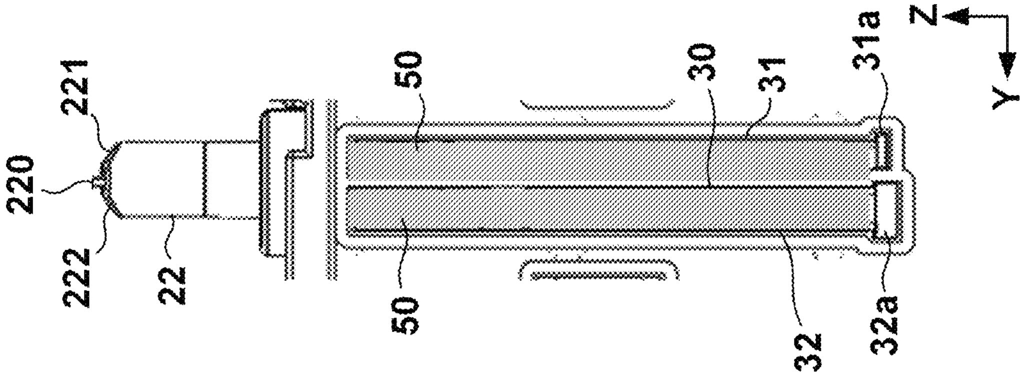
Figure 11A:
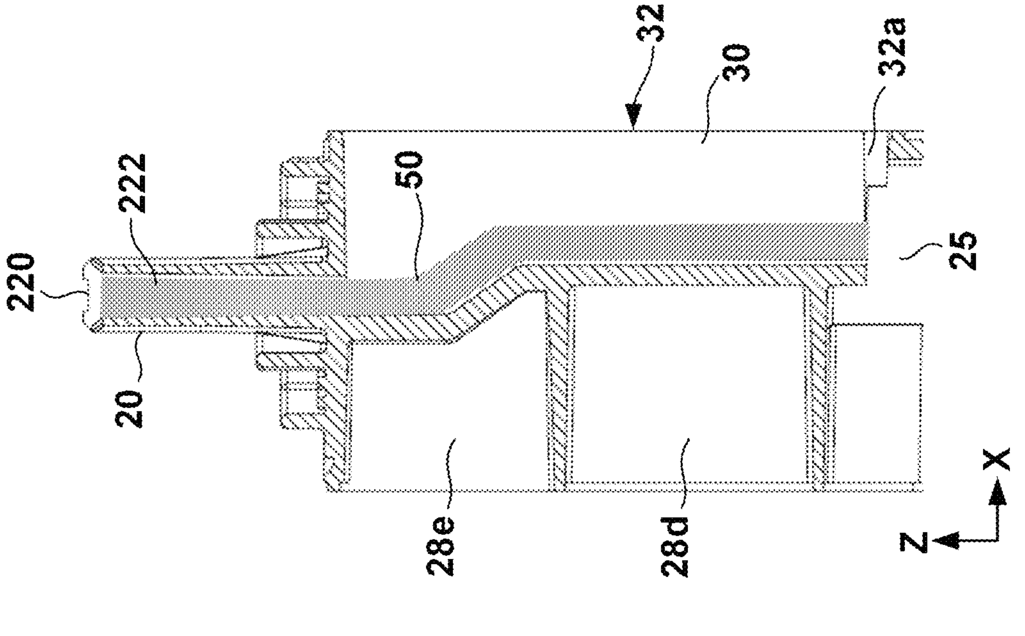

FIGS. 10A to 10C show a stage when the ink begins flowing from the replenishing bottle 5 into the channels 31 and 32. At the initial stage of ink flow-in, the ink substantially similarly flows into the channels 31 and 32. After that, as shown in FIGS. 11A to 11C, the ink reaches the opening portion 31*a* of the channel 31 and the opening portion 32*a* of the channel 32. A liquid film is readily formed on the opening portion 31*a* due to a surface tension because the opening area is small. A liquid film is hardly formed on the opening portion 32*a* because the opening area is large. In other words, the opening portion 31*a* is designed to have a small opening area such that a liquid film is readily formed, and the opening portion 32*a* is designed to be large such that a liquid film is hardly formed.

Figure 12A:
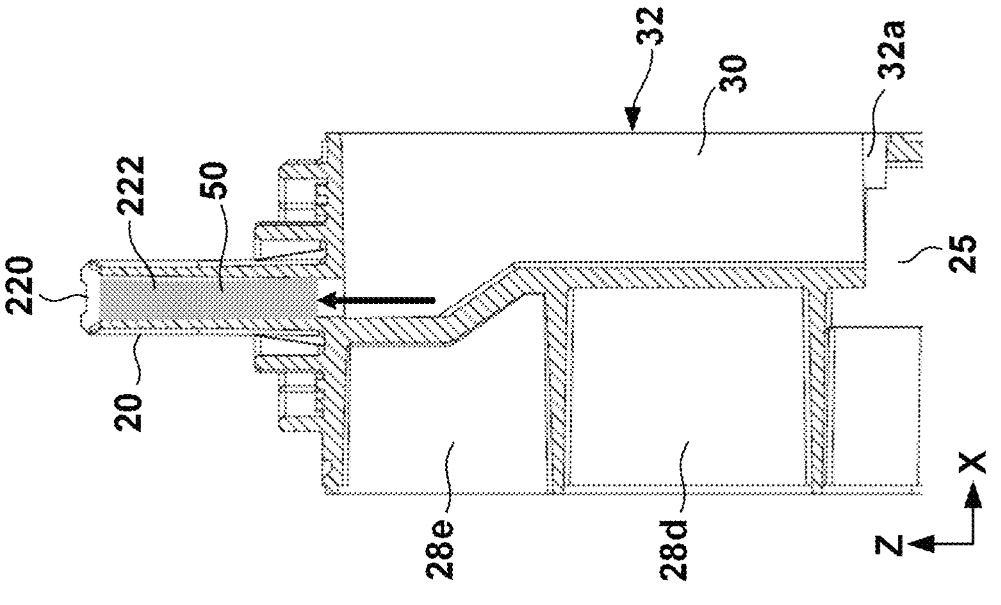
FIGS. 12A to 12C are schematic views showing the flow of ink when replenishing ink.
Figure 12B:
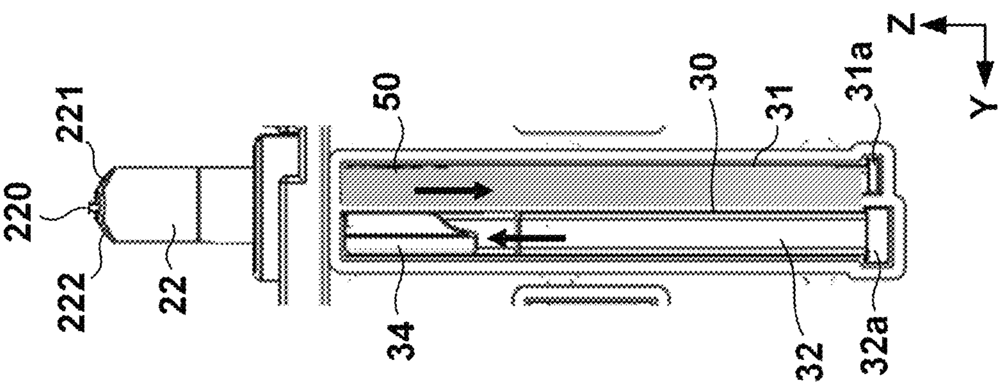
Figure 12C:
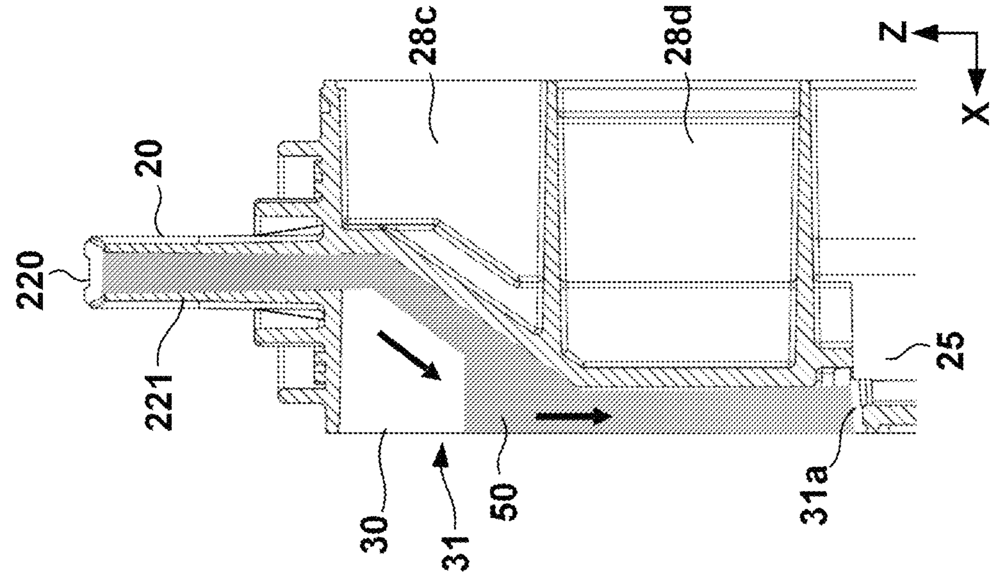
Figure 13A:
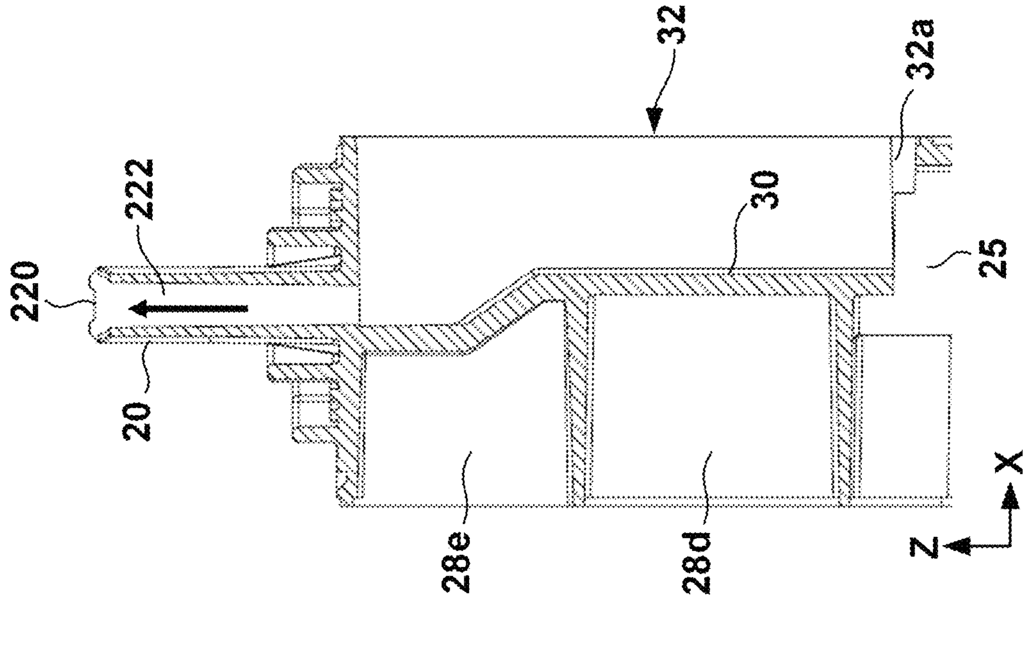
FIGS. 13A to 13C are schematic views showing the flow of ink when replenishing ink.
Figure 13B:
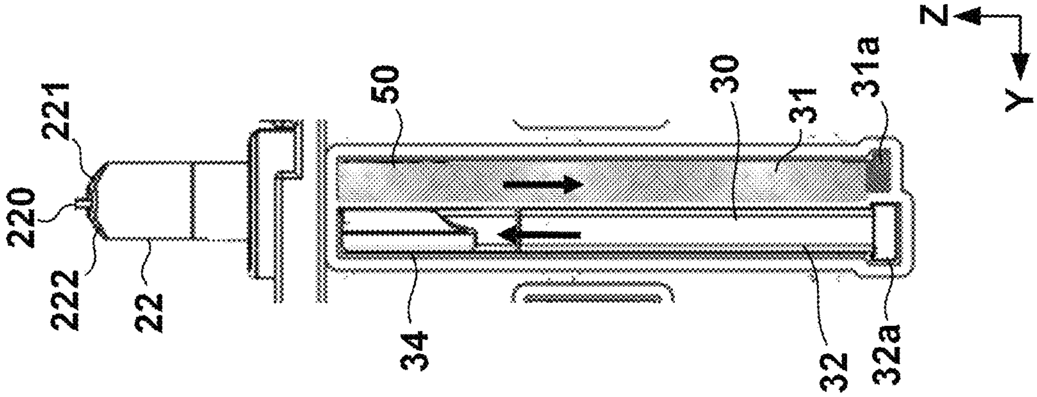
Figure 13C:
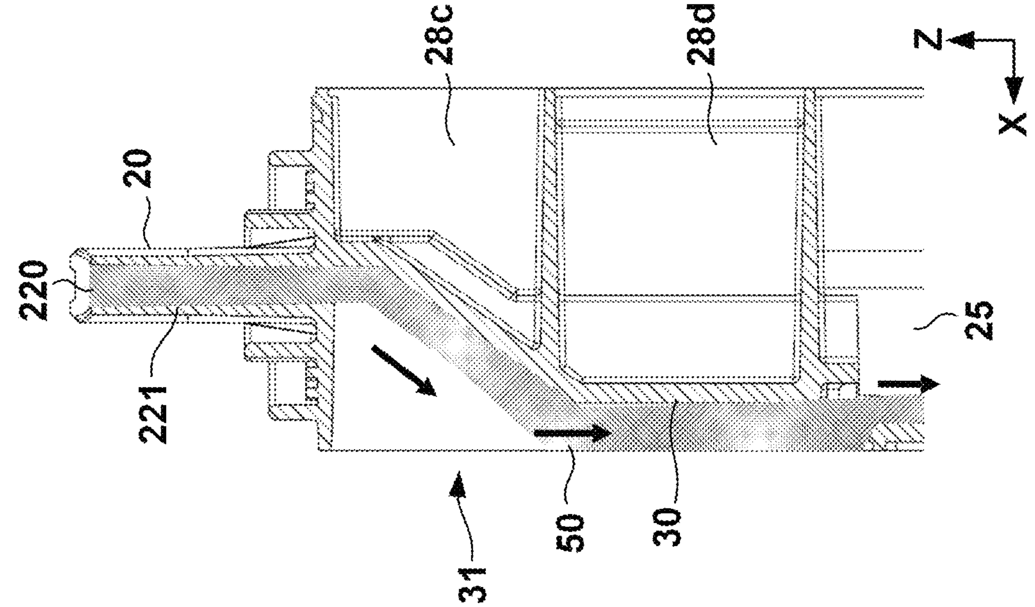

If closing of the channel 31 occurs, to solve the negative pressure in the replenishing bottle 5, air flows from the channel 32 that is not closed into the replenishing bottle 5, and the ink builds up in the channel 31, as shown in FIGS. 12A to 12C. When the weight of the ink built up in the channel 31 becomes more than the surface tension of the liquid film on the opening portion 31*a*, the ink begins passing through the opening portion 31*a* and flowing into the storage portion 25. After that, as shown in FIGS. 13A to 13C, the ink in the replenishing bottle 5 continuously flows into the storage portion 25 via the channel 31, and the air continuously flows into the replenishing bottle 5 via the channel 32. By this gas-liquid exchange, it is possible to smoothly make the ink flow from the replenishing bottle 5 into the storage portion 25.

In this embodiment, a liquid film by a surface tension is intentionally formed on the opening portion 31*a* at the initial stage, thereby implementing smooth and stable ink injection. To avoid formation of a liquid film by a surface tension at an unintended point, for example, the channels 221 and 222 are made to open obliquely at the distal end of the needle 22. This makes it difficult to form a liquid film of ink. In addition, the sectional area of the channel 221 is made larger than that of the channel 222, thereby allowing a larger amount of ink from the replenishing bottle 5 to flow into the ink tank 2 and improving the speed. Here, in this embodiment, R1<R11 holds concerning the length in the Z direction, and a relationship W3<W13 holds. That is, viewed from the needle 22, the channel 32 has a portion in which the sectional area or space is enlarged, as compared to the channel 31. In this enlarged portion, flowing ink may generate a vortex and lose energy, and its flow may be impeded. When the channel 31 is used as the distribution path of ink, and the channel 32 is used as the distribution path of air, the efficiency of ink flow-in to the ink tank 2 can be improved.

Second Embodiment

In the above-described embodiment, a shape portion 33 is provided in a channel 31, and a shape portion 34 is provided in a channel 32. However, the shape portion may be provided only in one of the channel 31 and the channel 32. In this case, the shape portion may be provided only in the channel 31 in which ink continuously flows.

In the above-described embodiment, an ink tank 2 has been exemplified as a liquid container, and a printing apparatus 1 including printheads 13A and 13B that discharge ink has been exemplified as an application purpose. However, the present invention can also be applied to a liquid container that stores a liquid other than ink or the application purpose of an apparatus including a discharge head that discharges a liquid other than ink.

DISCLOSURE OF EMBODIMENTS

The above-described embodiments disclose the following inventions of items.

The invention of Item 1 below is disclosed as an invention for providing a technique for mainly improving the flow-in speed of a liquid from a replenishing bottle to a liquid container.

Item 1. A liquid container comprising:

a storage portion configured to store a liquid to be supplied to a discharge head that discharges the liquid;

a needle configured to form a first channel and a second channel, which are inserted into a replenishing bottle configured to replenish the liquid to the storage portion to communicate with the replenishing bottle;

a third channel between the first channel and the storage portion; and a fourth channel between the second channel and the storage portion, wherein a first shape portion having a sectional shape common to a part of a sectional shape of the first channel is formed at an end portion of the third channel on a side of the first channel.

The invention of Item 2 below is disclosed as an invention for providing a technique for mainly suppressing liquid leakage from an air communicating port when a printing apparatus is installed in a posture different from use time or due to the influence of an external atmospheric pressure/temperature change.

Item 2. A liquid container comprising:

a container main body;

a storage portion formed in the container main body and configured to store a liquid to be supplied to a discharge head that discharges the liquid;

a first sealing member configured to seal a first side portion of the container main body;

a second sealing member configured to seal a second side portion of the container main body;

a plurality of buffer chambers formed in the container main body; and an air communicating port formed in the container main body so as to communicate with the storage portion via the plurality of buffer chambers, wherein the plurality of buffer chambers include:

a buffer chamber that opens to the first side portion and is sealed by the first sealing member; and a buffer chamber that opens to the second side portion and is sealed by the second sealing member.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-093094, filed Jun. 8, 2022, and No. 2022-169397, filed Oct. 21, 2022, which are hereby incorporated by reference herein in its their entirety.

What is claimed is:

1. A printing apparatus comprising a liquid container, wherein the liquid container comprises:

a storage portion configured to store a liquid to be supplied to a discharge head that discharges the liquid;

a first channel configured to be inserted into a replenishing bottle, which is configured to replenish the liquid to the storage portion, and to communicate with the replenishing bottle;

a second channel between the first channel and the storage portion;

a third channel configured to be inserted into the replenishing bottle, and to communicate with the replenishing bottle; and a fourth channel between the third channel and the storage portion, wherein the second channel includes, at an end portion on a side of the first channel, a first shape portion having a sectional shape common to a part of a sectional shape of the first channel, and wherein the fourth channel includes, at an end portion on a side of the third channel, a second shape portion having a sectional shape common to a part of a sectional shape of the third channel.

2. The apparatus according to claim 1, wherein a contour length of the sectional shape of the first shape portion common to the first channel is longer than a contour length of the sectional shape of the second shape portion common to the third channel.

3. The apparatus according to claim 1, wherein the second channel is a channel extended in a first direction, the fourth channel is a channel extended in the first direction, the second channel is a channel having a width in each of a second direction and a third direction, the second direction and the third direction intersecting the first direction, the fourth channel is a channel having a width in each of the second direction and the third direction, and the width of the second channel in the second direction is narrower than the width of the fourth channel in the second direction.

4. The apparatus according to claim 3, wherein the second channel includes:

a first changing portion whose width in the third direction decreases along with approach to the storage portion; and a first uniform portion formed from the first changing portion toward the storage portion and having the same width in the third direction, the fourth channel includes:

a second changing portion whose width in the third direction decreases along with approach to the storage portion; and a second uniform portion formed from the second changing portion toward the storage portion and having the same width in the third direction, and the width of the second channel in the third direction at the first uniform portion is narrower than the width of the fourth channel in the third direction at the second uniform portion.

5. The apparatus according to claim 1, wherein each of the first channel, the second channel, the third channel, and the fourth channel is a channel extended in a vertical direction, the first channel and the third channel are formed adjacent to each other in a lateral direction intersecting the vertical direction, and the second channel and the fourth channel are formed adjacent to each other in the lateral direction.

6. The apparatus according to claim 5, wherein a sectional area of the second channel and a sectional area of the fourth channel at the same position in the vertical direction are different.

7. The apparatus according to claim 5, wherein a sectional area of the first channel and a sectional area of the third channel at the same position in the vertical direction are different.

8. The apparatus according to claim 5, wherein a sectional area of the second channel is smaller than a sectional area of the fourth channel at the same position in the vertical direction, and a sectional area of the first channel is larger than a sectional area of the third channel at the same position in the vertical direction.

9. The apparatus according to claim 1, wherein a change of a sectional area at a boundary between the third channel and the fourth channel is larger than a change of a sectional area at a boundary between the first channel and the second channel.

10. The apparatus according to claim 1, wherein each of the first channel and the third channel is a channel extended in a vertical direction, an opening portion of the first channel on a side of the replenishing bottle opens obliquely with respect to a channel direction of the first channel, and an opening portion of the third channel on the side of the replenishing bottle opens obliquely with respect to a channel direction of the third channel.

11. The apparatus according to claim 1, wherein the second channel includes a first opening portion that opens to the storage portion, the fourth channel includes a second opening portion that opens to the storage portion, and an opening area of the first opening portion is smaller than an opening area of the second opening portion.

12. The apparatus according to claim 1, wherein the liquid container comprises:

a container main body;

a first sealing member configured to seal a first side portion of the container main body; and a needle configured to form the first channel and the third channel, the needle is a tubular member formed integrally with the container main body, and each of the second channel and the fourth channel is formed by a groove formed in the first side portion and the first sealing member.

13. The apparatus according to claim 12, wherein the liquid container comprises a second sealing member configured to seal a second side portion of the container main body, and the storage portion is formed by a space that opens to the second side portion and the second sealing member.

14. The apparatus according to claim 13, wherein the first channel is configured to project upward from a top portion of the container main body, and the space is formed on a side of a bottom portion of the container main body.

15. The apparatus according to claim 1, wherein a sectional shape of the first channel is a fan shape, and a sectional shape of the first shape portion is an arc shape.

16. The apparatus according to claim 1, wherein a sectional shape of the third channel is a fan shape, and a sectional shape of the second shape portion is an arc shape.

17. The apparatus according to claim 1, wherein the liquid container comprises:

a needle configured to form the first channel and the third channel;

a container main body configured to form the needle and the storage portion;

a first sealing member configured to seal a first side portion of the container main body;

a second sealing member configured to seal a second side portion of the container main body;

a plurality of buffer chambers formed in the container main body; and an air communicating port formed in the container main body and communicating with the storage portion via the plurality of buffer chambers, and the plurality of buffer chambers include:

a buffer chamber that opens to the first side portion and is sealed by the first sealing member; and a buffer chamber that opens to the second side portion and is sealed by the second sealing member.

18. The apparatus according to claim 17, wherein the plurality of buffer chambers include a first buffer chamber that communicates with the storage portion via a fifth channel, and if a posture of the liquid container is a posture with the second side portion located on a lower side, the fifth channel is formed at a position higher than a liquid surface of a maximum amount of ink stored in the storage portion.

19. The apparatus according to claim 17, wherein the air communicating port is formed in a third side portion of the container main body.

20. The apparatus according to claim 17, wherein the liquid container comprises an outlet portion of the liquid, which is formed in the container main body, and the outlet portion is formed at a position higher than a liquid surface of a maximum amount of ink stored in the storage portion.

21. The apparatus according to claim 17, wherein the liquid container comprises an outlet portion of the liquid, which is formed in the container main body, the outlet portion communicates with the storage portion via a fifth channel, and the fifth channel is formed by a groove formed in the container main body and the first sealing member.

22. The apparatus according to claim 17, wherein the plurality of buffer chambers include:

a first buffer chamber that communicates with the storage portion; and a second buffer chamber that communicates with the air communicating port, the first buffer chamber opens to the first side portion and is sealed by the first sealing member, and the second buffer chamber opens to the second side portion and is sealed by the second sealing member.

23. The apparatus according to claim 17, wherein the plurality of buffer chambers include:

a first buffer chamber that communicates with the storage portion via a fifth channel; and a second buffer chamber that communicates with the first buffer chamber via a sixth channel, the first buffer chamber and the second buffer chamber open to the first side portion and are sealed by the first sealing member, and the sixth channel is formed by a groove formed in the container main body and the second sealing member.

24. A liquid container comprising:

a storage portion configured to store a liquid to be supplied to a discharge head that discharges the liquid;

a first channel inserted into a replenishing bottle configured to replenish the liquid to the storage portion to communicate with the replenishing bottle;

a second channel located between the first channel and the storage portion and having a sectional area larger than a sectional area of the first channel;

a third channel configured to be inserted into the replenishing bottle, and to communicate with the replenishing bottle; and a fourth channel between the third channel and the storage portion and having a sectional area larger than a sectional area of the third channel, wherein the second channel includes, at an end portion on a side of the first channel, a first shape portion having a sectional shape common to a part of a sectional shape of the first channel, and wherein the fourth channel includes, at an end portion on a side of the third channel, a second shape portion having a sectional shape common to a part of a sectional shape of the third channel.

25. The apparatus according to claim 1, wherein the first shape portion is formed from an end of the second channel on a side of the first channel in an extending direction of the second channel within a range in the second channel.

26. The apparatus according to claim 1, wherein the second channel has a sectional area larger than a sectional area of the first channel.

27. The apparatus according to claim 1, wherein the fourth channel has a sectional area larger than a sectional area of the third channel.

28. The apparatus according to claim 1, wherein the second shape portion is formed from an end of the fourth channel on a side of the third channel in an extending direction of the fourth channel within a range in the fourth channel.

29. The apparatus according to claim 1, wherein the second channel communicates with the first channel and the storage portion.

30. The apparatus according to claim 1, wherein the fourth channel communicates with the third channel and the storage portion.

* * * * *